Dec. 5, 1967  C. B. SIMS, SR  3,356,196
FRUIT GATHERING MACHINE
Filed Feb. 25, 1966  2 Sheets-Sheet 1

INVENTOR
COLIN B. SIMS SR.

Dec. 5, 1967 C. B. SIMS, SR 3,356,196
FRUIT GATHERING MACHINE
Filed Feb. 25, 1966 2 Sheets-Sheet 2
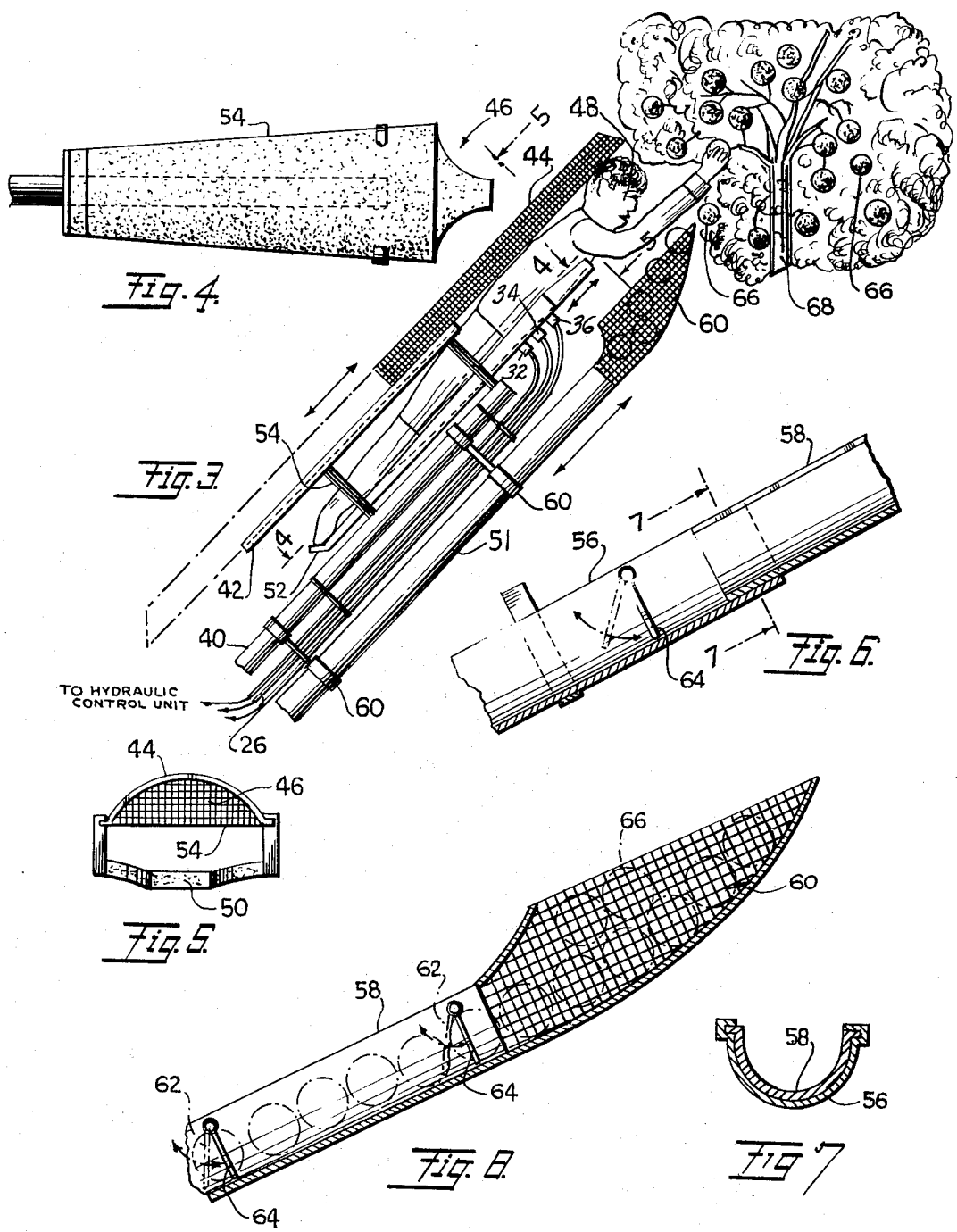
INVENTOR.
COLIN B. SIMS SR.

United States Patent Office 3,356,196
Patented Dec. 5, 1967

3,356,196
FRUIT GATHERING MACHINE
Colin B. Sims, Sr., 1806 19th Ave.,
Vero Beach, Fla. 32960
Filed Feb. 25, 1966, Ser. No. 529,981
5 Claims. (Cl. 193—7)

ABSTRACT OF THE DISCLOSURE

A new and improved fruit gathering machine having means adapted to receive an operator and automatic power controls operable by the operator whereby the operator can raise or lower himself and/or move himself from side to side to be in a position to pick fruit from a tree or the like.

Summary of the invention

A fruit gathering machine of the character indicated which is also provided with means to collect the picked fruit and to be moved from place to place by a tractor or other vehicle.

Brief description of the drawing

In the drawings:
FIG. 3 is a cut away side view of the boom assembly;
FIG. 4 is a top view of the picker's rack;
FIG. 5 is an end view of the boom assembly;
FIG. 6 is a detail side view of the telescoping members of the fruit chute;
FIG. 7 is a view through 7—7 of FIG. 6;
and
FIG. 8 is a detail side view of the fruit receiving portion of the fruit chute.

Description of preferred embodiments

Figure 1:
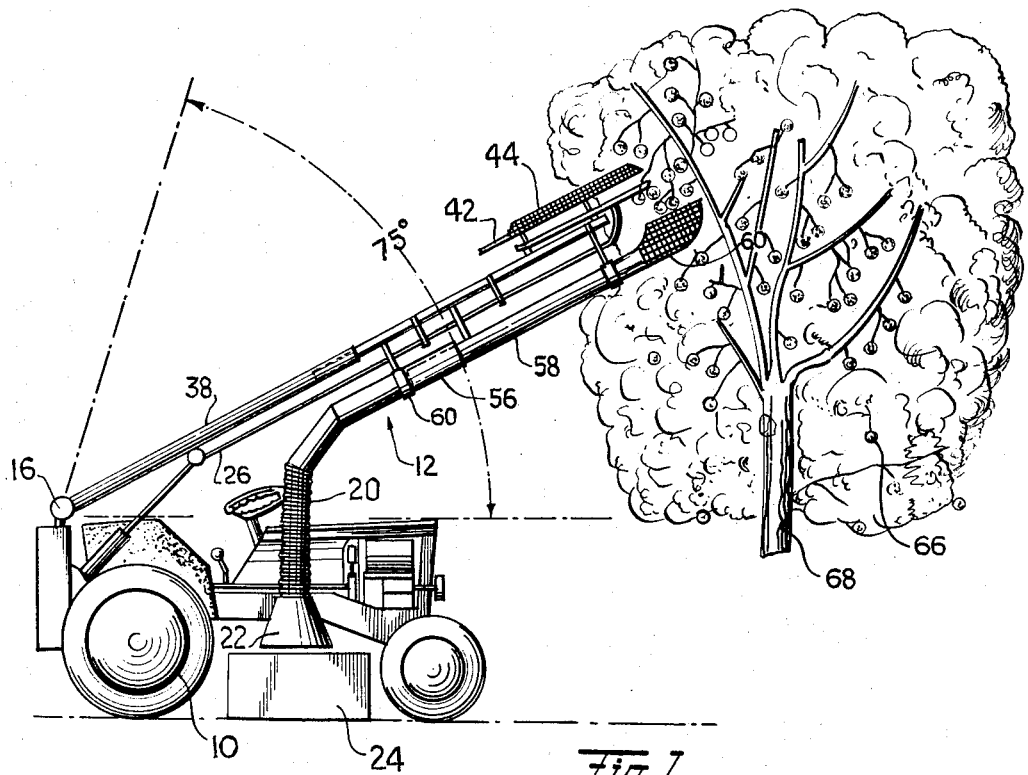
FIG. 1 is a side view of my invention, in use.
Figure 2:
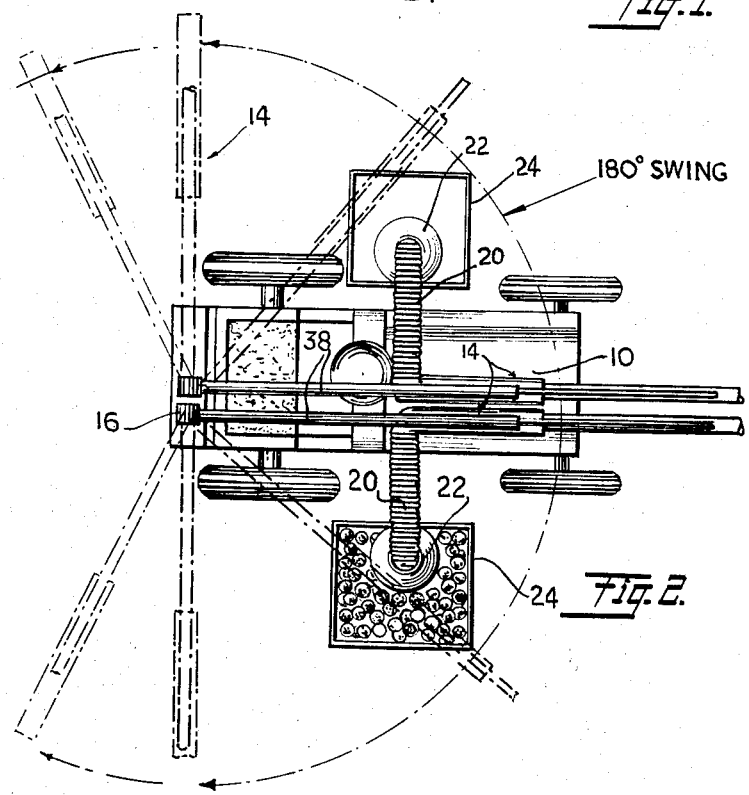
FIG. 2 is a top view thereof.

Referring now to FIGS. 1–8, there is shown a conventional tractor 10 having a boom 14 and fruit chute assembly 12. The boom 14 is pivotally secured at 16 to the rear of the tractor. The main portion of the chute assembly is strapped to the boom at spaced apart locations 18; the bottom portion is connected to the top end of a flexible hollow tube 20; the bottom end of the tube 18 is connected by a flared out hollow truncated cone 22 to a fruit collection bin 24 on the tractor.

Rear mounted twin hydraulic pivots 26 under the operation of finger controls 32, 34 and 36 and mounted high enough to provide a clear swing over wheels and equipment permit the boom and chute to be swung through or positioned at any point along a horizontal 180° arc (FIG. 2) and/or swung up or down or positioned at any point along a vertical 75° arc (FIG. 1) and or telescoped in or out over a maximum distance of eight feet or any position in between. The hydraulic system is conventional and can be controlled by hydraulic motors identical to those used on tractors with digger mechanisms for use in digging septic tanks or as used on hydraulic booms on some line trucks.

The boom includes two telescoping hollow elongated members 38 and 40 operating a slide track 42 for an operator's protective wire mesh canopy 44. A picker's rack 46 has a padded cover 54 to support the back of an operator 48 while a packer's couch 51 having a foot rest 52 supports the front of the operator. Controls 32, 34 and 36 are secured to the underside of couch 51 and are under the manual control of the operator. The rack and couch are secured together and to the member 40 by strap members 54.

The fruit chute comprises first and second telescoping hollow open trough members 56 and 58, member 58 being strapped to member 40 at 60 and movable therewith. The open end of member 58 carries an open mesh fruit basket 60. Members 56 and 58 have baffles 62 therein adjustable by handles 64 and spring loaded to permit adjustment of baffle angle in the chute and to set the baffle tension.

In use, the boom is first lowered to a horizontal position; an operator climbs therein and then operates the controls to position the boom and himself in position to pick fruit 66 from a tree 68. The fruit is inserted by the operator into basket 60 and falls through member 56 and 58, tube 18 and cone 22 into bin 24. The baffles 62 are adjustable to control the rate at which the fruit falls into the bin to prevent jamming along the passage and to permit proper filling of the bin.

While I have described my invention with particular reference to the drawings, my protection is to be limited only by the terms of the claims which follow.

Having thus described my invention, I claim as new and desire to secure by Letters Patent:

1. A fruit gathering machine adapted for connection to a tractor or other vehicle and comprising a telescoping boom, hydraulic means coupled to said boom to adjust the position of one end thereof selectively in three dimensions, up and down, side to side and in and out, operator support means secured to said boom and movable therewith, said means including a picker's rack which has a padded curved cover to support the back of an operator and which is secured to the boom and extends rearward therealong from the front end and a packer's couch spaced apart from the rack and parallel thereto, whereby when an operator is supported thereby the head and arms of the operator are always positioned adjacent said one end, and manually operable controls for said hydraulic means secured to said support means and accessible to said operator.

2. A machine as set forth in claim 1 further including a telescoping fruit collection chute secured to said boom and operable therewith, one end of said chute being adjacent said one end of the boom, and an open fruit basket secured to said one of the chute whereby the operator can place picked fruit in said basket.

3. A machine as set forth in claim 2 further including a fruit collection bin positioned adjacent the other end of said chute, said other end being the lower end whereby collected fruit falls by gravity through said chute into said bin.

4. A machine as set forth in claim 3 wherein said chute is provided with manually adjustable baffles for controlling the rate of passage of fruit through the chute.

5. A machine as set forth in claim 4 further including a hollow vertical tube coupled at its upper end to the lower end of the chute and a hollow truncated cone positioned above the bin and connected to the lower end of said tube.

References Cited

UNITED STATES PATENTS

| | | | |
|---|---|---|---|
| 455,328 | 7/1891 | Herbert | 193—30 |
| 2,317,606 | 4/1943 | Harris | 214—83 |
| 2,821,312 | 1/1958 | Wiegel | 193—7 |
| 2,925,162 | 2/1960 | De Tuncq | 193—7 |

ANDRES H. NIELSEN, *Primary Examiner.*